April 6, 1943.   R. W. WENGEL   2,315,914
FILM GATE FOR PROJECTORS
Filed Sept. 26, 1940
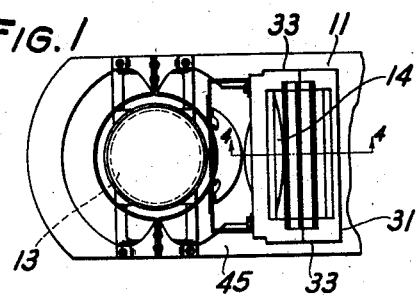
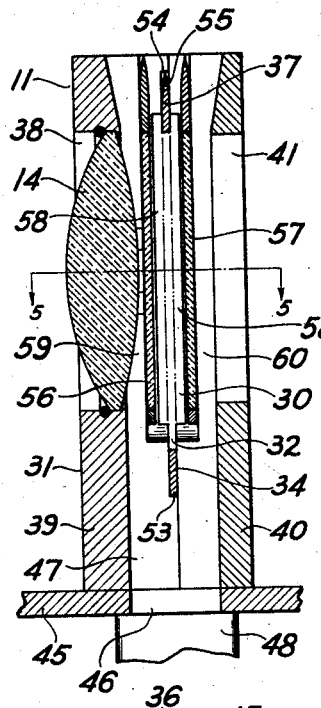
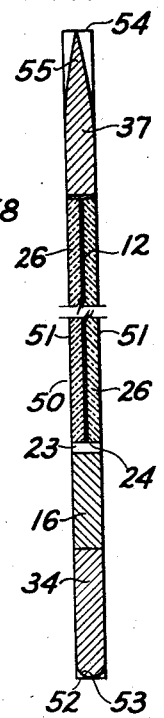
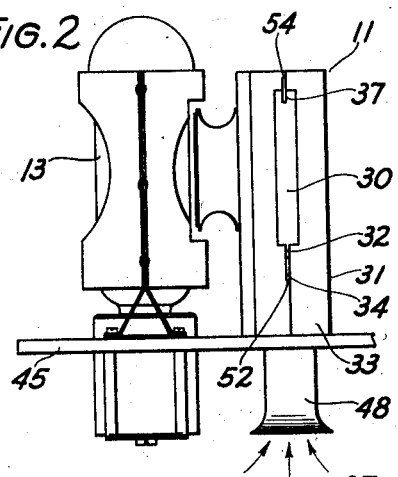
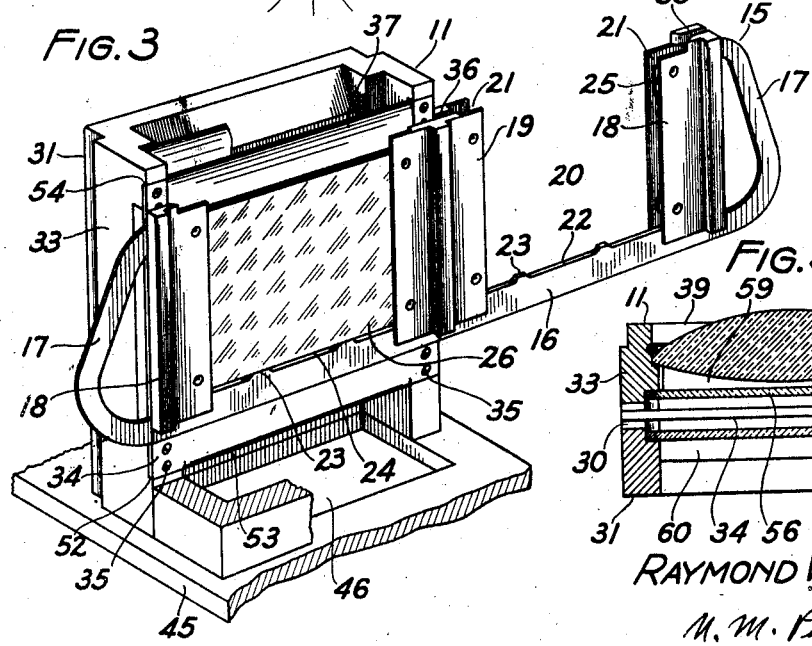
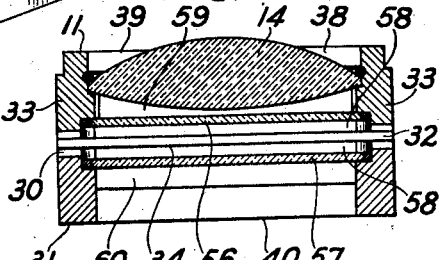
RAYMOND W. WENGEL
INVENTOR
BY
ATTORNEYS Patented Apr. 6, 1943

2,315,914

UNITED STATES PATENT OFFICE 2,315,914

FILM GATE FOR PROJECTORS

Raymond W. Wengel, Rochester, N. Y., assignor to Eastman Kodak Company, Rochester, N. Y., a corporation of New Jersey Application September 26, 1940, Serial No. 358,489

10 Claims. (Cl. 88—24)

The present invention relates to improvements in a projecting apparatus, and more particularly to a cooling arrangement for the film gate thereof.

One object of the invention is the provision of an arrangement for directing substantially non-turbulent or stream-lined air over the image area positioned in the gate to effectively cool the area.

Another object of the invention is the provision of a slide carrier which cooperates with the carrier supporting and guiding members of the projector to form a unitary air foil section which effectively splits an incoming cooling air blast into two thin streams which pass through the gate in substantially non-turbulent or stream-lined relation.

A further object of the invention is the provision of an air foil section of the class described which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a top plan view of a portion of a projector, showing a gate arrangement constructed in accordance with the present invention;

Fig. 2 is a side elevation view of the mechanism illustrated in Fig. 1, showing the general arrangement of the various parts;

Fig. 3 is a perspective view of the gate, on a larger scale than Figs. 1 and 2, showing the relation of the gate parts and the slide carrier;

Fig. 4 is a vertical sectional view through the gate mechanism taken substantially on line 4—4 of Fig. 1, but on a larger scale than the latter, showing the relation of the various parts;

Fig. 5 is a horizontal sectional view taken substantially on line 5—5 of Fig. 4; and Fig. 6 is a vertical sectional view through the slide carrier and slide, and the slide carrier supporting and guiding members, showing the arrangement of these parts to form an air foil section which is adapted to split the incoming air blast into two non-turbulent cooling streams.

Similar reference numerals throughout the various views indicate the same parts.

The present invention relates to a projector, but only so much of the projector will be shown as relates to the present invention and is necessary to a complete understanding thereof. The projector is formed with a gate, generally indicated by the numeral 11, in which an image area or transparency 12 is adapted to be positioned for projection. This image area may be mounted in cardboard, or, as in the present embodiment, between a pair of transparent glass cover plates 26, or cemented to a single glass plate. A light source, such as a lamp 13, is positioned behind the gate 11 and in alignment therewith and is adapted to project the image of the transparency 12 onto a suitable viewing screen, not shown. A suitable condensing lens 14 is positioned between the lamp 13 and the image area 12, as shown in Fig. 4.

The image areas or transparencies are mounted in a slide carrier, broadly designated by the numeral 15, which is formed from a strip of sheet material, preferably sheet metal, to form a bottom 16 adapted to support the image areas 12 and the cover plates 26. The material forming the bottom 16 is preferably equal in thickness to that of the slide 12 and cover plates 26, as shown in Fig. 6, so as to form a continuation thereof, for a reason to be later pointed out. The ends of the carrier strip are bent up to form handles 17 by which the carrier 15 may be slid transversely of the projector to bring one of the image areas 12 into projecting position, as is well known in the art. Spaced end posts 18 and a center post 19 are secured to and extend upwardly from the bottom 16 to form a pair of slide retaining pockets 20 in which a pair of transparencies or image areas 12 may be mounted. The posts 18 and 19 are formed with vertical slots or channels 21 adapted to receive the side edges of the slide which comprises the transparency 12 and its cover plates 26, as is well known, the bottom edge of the slide being supported by the bottom 16 of the slide carrier 15.

In order to properly position and orient the areas 12 in the pockets 20 and to prevent the areas from tilting therein, the top edge 22 of the bottom member 16 is provided with a pair of spaced lugs 23, as best shown in Fig. 3, which support the bottom edge 24 of each slide. The lugs 23 are made small, preferably less than $\tfrac{1}{16}$ of an inch in height, so as to reduce the space between the bottom 24 of the slide and the top 22 of the member 16 to thus prevent whistling of the cooling air streams as they pass over the gap between the top 22 and the bottom 24 of the slide. Springs 25 may be positioned in each of the slots 21 so as to engage one of the cover plates 26 to retain the slide in the plane of the bottom 16, as shown in Fig. 6, so that the latter may be effective to support the slide, as is apparent.

The slides with their image areas or transparencies 12 may be selectively moved into projecting position by sliding the carrier 15 in the projector, in the manner well known in the art. The carrier 15 is movable through an opening 30 formed in the gate housing 31, and the bottom 16 of the carrier extends into slots 32 formed in the opposite side walls 33 of the housing 31 and rests on and is supported by a lower guide rail or strip 34 extending across the gate and secured to the side walls 33 by screws 35 or other suitable fastening means. The tops of the posts 18 and 19 are formed with longitudinally extending slots 36 adapted to receive a top guide rail or strip 37 suitably secured to the side walls 33 and arranged in vertical alignment with the lower guide rail 34. This top rail 37 extends downwardly almost into contact with the upper edge of the slide, see Fig. 6, so as to thus reduce to a minimum the space therebetween in order to eliminate whistling of the cooling air streams as they pass across the space between the slide and the top rail. The two rails 34 and 37 thus serve to guide the carrier 15 as it is moved across the projector so as to retain the image areas in proper axial relation with the various optical members of the projector. The two guide rails 34 and 37 are made equal in width to the carrier 15 and the transparency slide, as shown in Fig. 6, to provide a substantially continuous member, the purpose of which construction will be hereinafter more fully explained. The lens 14 is preferably mounted in an opening 38 formed in the rear wall 39 of the housing 31, while the front wall 40 of the latter is formed with a projectional aperture 41 arranged in optical alignment with the lamp 13 and lens 14, all as shown in Fig. 4.

The light rays from the lamp 13 thus serve to project the image of the transparency 12 onto a suitable viewing screen positioned in the path of the projected image-bearing rays, as is well known. In heavy duty projectors, for example, those in which a high wattage lamp is used, a large amount of heat is emitted by the lamp. Due to the injurious effect of this heat on the image area, various arrangements have been provided for cooling the latter during the projecting operation, all of which is well known to those in the art. The present invention, however, provides a novel, simple cooling arrangement in which the area is effectively cooled to prevent injury thereto. To secure this result, the plate 45 on which the lamp 13 and gate housing 31 are mounted, see Fig. 2, is formed with an opening 46 in alignment with a vertically extending air passage 47 formed in the housing 31, as best shown in Fig. 4. This air passage extends substantially the full width of the housing, as clearly shown in Figs. 3 and 5. An air supply conduit 48 is suitably secured to the plate 45 and is in fluid communication with the air passage 47 through the opening 46. Air is supplied to the conduit from any suitable source, not shown.

In order to properly cool the image area in the gate, it is common practice to supply streams of cooling air to the opposite faces of the area. It has been found after exhaustive tests that the most effective and uniform cooling of the area 12 is secured when the cooling air streams passing over the area are non-turbulent. It has also been found that non-turbulent cooling air streams can be made very thin without affecting the ability to cool the area, thus requiring the least volume of air for a given cooling effect.

The streamlining of the air channels also reduces the resistance to flow to a minimum, thus effecting a reduction in the power consumption of the fan, and also permits the maximum air veloctiy without creating turbulence in the cooling air streams.

As is known, an air-foil section will effectively divide or split a single blast or stream of air into two separate streams which will then pass over the opposite faces of the air foil in substantially non-turbulent or stream-lined relation, and will later be brought together or merged into a single stream as they leave the section. The present invention has utilized the air-foil principles to split the single air blast applied to the air passage 47 by the air conduit 48 into two separate non-turbulent cooling streams. It is apparent from an inspection of Fig. 6, that the upper and lower guide rails 37 and 34 cooperate with the slide carrier 15 and the slide with its transparency 12 to provide a continuous member of uniform thickness, broadly designated by the numeral 50, which extends from a point below the lens 14 to a point above the latter. This member 50 thus extends across the projection aperture or gate.

In order to insure the passing of separate air streams over both exposed faces 51 of the cover plates 26 to effectively cool the image area 12, the lower or leading edge 52 of the bottom rail 34 has the center portion thereof rounded, as clearly shown at 53, Fig. 6. This rounded portion thus provides a nose of an air foil section and effectively divides or splits the single air blast, supplies by the conduit 48, into a pair of non-turbulent streams which flow upwardly along opposite faces 51 of the cover plates 26 to effectively cool the transparency 12. The trailing edge 54 of the upper guide rail 37 is tapered, shown at 55, Fig. 6, to provide a tail portion which will effectively reunite the two non-turbulent air streams so that the latter will pass in a single stream out of the top of the housing 31. It is thus apparent that the two guide rails 34 and 37 together with the carrier 15 and the mounted slide form, in effect, a continuous, unitary air-foil section, as clearly shown in Fig. 6.

A pair of transparent members 56 and 57 are mounted in the side walls 33 of the gate housing 31 and extend across the latter adjacent and substantially parallel to the cover plates 26 to provide thin air channels 58 through which the pair of non-turbulent cooling air streams pass, as mentioned above. The rear glass 56 is of a heat resisting and heat absorbing material, for reasons well known in the art. The cross sectional area of each channel 58 is such as to provide a non-turbulent air stream across a face 51 of one of the plates 26, the precise cross section varying with the velocity of the air supplied in the channel. It has been found, however, that with a given air velocity and air friction, there is a definite cross sectional area above which air in the channel 58 will become turbulent and below which the stream-lined relation will be maintained. To secure the best results, the latter arrangement should obviously be used.

With the above-described arrangement, the air-foil 50 serves to split the incoming blast, supplied by the conduit 48 to provide a pair of thin non-turbulent air streams which pass through the channel 58 to cool both faces of the slide and the area 12, and also the front side of the rear glass 56 and the rear side of the front glass 57. A third air passage 59 is provided between the rear glass 56 and the condenser lens 14 to cool the latter as well as the rear face of the plate 56, as is apparent from an inspection of Fig. 4. The front glass plate 57 may be mounted directly in the front wall 40 of the gate housing 31 in which case only the rear face of the plate 57 will be cooled by the air stream passing through the front air channel 58. However, the front glass plate may be spaced from the front wall 40, as in the present embodiment, to afford a fourth air passage 60 for cooling the front face of the glass plate 57, as clearly shown in Fig. 4.

It is thus apparent that the present invention provides a gate in which the slide or transparency is mounted in and forms a part of an air-foil section which is adapted to split an incoming air blast to provide separate cooling air streams which pass in non-turbulent or stream-lined relation over the opposite sides or faces of the slide or transparency to effectively cool the latter, and then reunite these non-turbulent streams into a single stream as they pass out of the top of the gate housing. The slide and slide carrier cooperate with the carrier supporting guide rails to form this air-foil section. The width of the space or gap between the slide and the bottom member 16 of the slide 15, and also the width of the space or gap between the top of the slide and the top guide rail 37 are preferably reduced to a minimum, as clearly shown in Figs. 3 and 6, so that the cooling air streams which pass through the channels 58 will not be forced to jump across large gaps or spaces, thus effectively eliminating audible whistling of the cooling air streams, the advantages of which will be readily apparent to those in the art.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. In a projection apparatus, the combination with a gate adapted to receive an image area to be projected, a cooling-air blast directed to one side of said gate, of an air-foiled section positioned in said gate and adapted to split said blast into two streams which pass in non-turbulent relation through said gate and over the opposite sides of said area to cool the latter, and means for supporting said area on said section.

2. In a projection apparatus, the combination with a gate adapted to receive an image area to be projected, a cooling-air blast directed to one side of said gate, of an air-foil section positioned in said gate and adapted to split said blast into two streams which pass in non-turbulent relation through said gate, means for supporting said area on said section, and means positioned on opposite sides of said section for directing said streams along opposite sides of said area to cool the latter.

3. In a projection apparatus, the combination with a gate adapted to receive an image area to be projected, a cooling-air blast directed to one side of said gate, of an air-foil section positioned in said gate and adapted to split said blast into two streams which pass in non-turbulent relation through said gate and over the opposite sides of said area to cool the latter, means for supporting said area on said section, and a portion on said section for reuniting said streams after the latter have passed over said area.

4. In a projection apparatus, the combination with a gate adapted to receive an image area to be projected, a cooling-air blast directed toward the bottom of said gate, of an air-foil section positioned in said gate and comprising a nose portion extending below said gate and into said blast to split the latter into two streams which pass in non-turbulent relation through said gate, and means for supporting said area on said portion.

5. In a projection apparatus, the combination with a gate adapted to receive an image area to be projected, a cooling-air blast directed toward the bottom of said gate, of an air-foil section positioned in said gate and comprising a nose portion extending below said gate and into said blast to split the latter into two streams which pass in non-turbulent relation through said gate, means for supporting said area on said portion and between said streams so as to be cooled by the latter, and a tail portion on said section positioned above said gate to reunite said streams after the latter have passed over said area.

6. In a projection apparatus, the combination with a gate adapted to receive an image area to be projected, a cooling-air blast directed toward the bottom of said gate, of an air-foil section mounted in said gate and comprising a stationary portion positoned below said gate and extending into said blast to divide the latter into two non-turbulent streams, a movable foil portion mounted on and supported by said stationary portion, and means on said movable portion for mounting said area thereon between said streams so as to be cooled thereby.

7. In a projection apparatus, the combination with a gate adapted to receive an image area to be projected, a cooling-air blast directed toward the bottom of said gate, of an air-foil section mounted in said gate and comprising a stationary portion positioned below said gate and extending into said blast to divide the latter into two non-turbulent streams, a movable foil portion mounted on and supported by said stationary portion, means on said movable portion for mounting said area thereon between said streams so as to be cooled thereby, and a second stationary foil portion positioned above said gate and in alignment with said first portion for reuniting said streams as the latter emerge from said gate.

8. In a projection apparatus, the combination with a gate adapted to receive an image area to be projected, a cooling-air blast directed toward the bottom of said gate, of an air-foil section mounted in said gate and comprising upper and lower stationary members and an intermediate member movably mounted on and supported by said lower member, means on said intermediate member for positioning said area so that the latter may be projected, means on said lower member for splitting said blast into two streams which flow in non-turbulent relation through said gate and over the opposite faces of said area to cool the latter, and means on said upper member for reuniting said streams after the latter have passed over said area, said members being spaced so as to provide gaps of minimum width to eliminate audible whistling of the air streams as they pass over said gaps.

9. In a projection apparatus, the combination with a gate adapted to receive an image area to be projected, a cooling-air blast directed toward the bottom of said gate, of an air-foil section mounted in said gate and comprising upper and lower stationary members and an intermediate member movably mounted on and supported by said lower member, means on said intermediate member for positioning said area so that the latter may be projected, means on said lower member for splitting said blast into two streams which flow in non-turbulent relation through said gate and over the opposite faces of said area to cool the latter, means on said upper member for reuniting said streams after the latter have passed over said area, said members being spaced so as to provide gaps of minimum width to eliminate audible whistling of the air streams as they pass over said gaps, and stationary plates positioned adjacent the opposite faces of said area to direct said streams through said gate.

10. In a projecting apparatus, the combination with a film gate, a cooling-air blast directed toward said gate, of a slide carrier adapted to receive image areas and movable in said gate to bring one of said areas into projecting position therein, means on said carrier for positioning said areas thereon, a lower stationary guide rail mounted in said projector and adapted to guide and support said carrier, an upper stationary guide rail positioned in the plane of and cooperating with said lower rail to guide said carrier, a rose portion formed on the leading edge of said lower rail and directed into said blast to split the latter into two separate streams which pass in non-turbulent relation through said gate and over opposite faces of said positioned area to cool the latter, a pair of glass plates positioned adjacent said faces and in substantially parallel relation therewith and cooperating with said areas to direct said streams through said gate, and a converging portion formed on the trailing edge of said upper rail to reunite said streams after the passage of the latter through said gate.

RAYMOND W. WENGEL.